United States Patent
Tinker (10) Patent No.: US 7,221,725 B2
(45) Date of Patent: May 22, 2007

(54) HOST INTERFACE DATA RECEIVER

(75) Inventor: Darrell E. Tinker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 740 days.

(21) Appl. No.: 10/608,934

(22) Filed: Jun. 27, 2003

(65) Prior Publication Data

US 2004/0264614 A1 Dec. 30, 2004

(51) Int. Cl.
H04L 7/00 (2006.01)
H04L 7/02 (2006.01)
H04L 25/40 (2006.01)

(52) U.S. Cl. .................. 375/355; 375/360; 375/371

(58) Field of Classification Search ............... 375/257, 375/355, 360, 361, 371, 373, 375, 376
See application file for complete search history.

(56) References Cited

U.S. PATENT DOCUMENTS 6,263,034 B1 * 7/2001 Kanack et al. .............. 375/371
6,556,640 B1 * 4/2003 Baba .......................... 375/376
6,760,389 B1 * 7/2004 Mukherjee et al. ......... 375/326
2003/0165207 A1 * 9/2003 Noguchi et al. ............ 375/371

* cited by examiner

Primary Examiner—Don N. Vo
(74) Attorney, Agent, or Firm—Garlick Harrison & Markison; Bruce E. Garlick (57) ABSTRACT

A host interface includes transition detection circuitry, transition phase averaging circuitry, and bit stream sampling circuitry. The transition detection circuitry receives an incoming bit stream and a reference clock signal and detects transitions of the incoming bit stream with respect to the reference clock signal. The transition detection circuitry also determines relative phases of the transitions with respect to the reference clock signal. The transition phase averaging circuitry determines an average relative phase of the detected transitions with respect to the reference clock signal and also determines, based upon the average relative phase of the detected transitions with respect to the reference clock signal, a sampling phase with respect to the reference clock signal. The bit stream sampling circuitry samples the incoming bit stream at the sampling phase with respect to the reference clock signal to extract the bit values. The incoming bit stream may comply with the Universal Serial Bus 2.0 interface standard.

20 Claims, 11 Drawing Sheets

FIG. 1

FIG. 2
*multi-function handheld device 40*

FIG. 3
integrated circuit 12-2

FIG. 4
Host Interface - 18

HOST INTERFACE DATA RECEIVER

BACKGROUND OF THE INVENTION

1. Technical Field of the Invention

This invention relates generally to portable electronic equipment and more particularly to a multi-function handheld device.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Handheld devices employ a host interface to a host, e.g., computer. As the host interface technology advances so does the bit rate supported. The USB 2.0 standard supports a maximum bit rate of 480 Mbps, using a non-synchronous serial bit stream transfer technique. While a transmitting device has little difficulty in creating this bit stream, a receiving device has great difficulty in synchronizing to the incoming bit stream and sampling the incoming bit stream at an appropriate location, e.g., midway between possible transition times. Thus, a need exists for a host interface that synchronizes to the host interface bit stream and that correctly extracts incoming digital information from the host interface bit stream.

BRIEF SUMMARY OF THE INVENTION

An apparatus of the present invention for extracting bit values from an incoming bit stream substantially meets these needs and others and includes transition detection circuitry, transition phase averaging circuitry, and bit stream sampling circuitry. The transition detection circuitry receives the incoming bit stream and a reference clock signal and detects transitions of the incoming bit stream with respect to the reference clock signal. The transition detection circuitry also determines relative phases of the transitions with respect to the reference clock signal. The transition phase averaging circuitry operably couples to the transition detection circuitry and determines an average relative phase of the detected transitions with respect to the reference clock signal. The transition phase averaging circuitry also determines, based upon the average relative phase of the detected transitions with respect to the reference clock signal, a sampling phase with respect to the reference clock signal. The bit stream sampling circuitry operably couples to the transition phase averaging circuitry and to the transition detection circuitry and samples the incoming bit stream at the sampling phase with respect to the reference clock signal to extract the bit values. The incoming bit stream may comply with the Universal Serial Bus 2.0 interface standard.

In determining an average relative phase of the detected transitions with respect to the reference clock signal, the transition phase averaging circuit may: (1) determine an initial average relative phase with respect to the reference clock signal based upon a first plurality of relative phases of a first plurality of transitions of the incoming bit stream; and (2) determine a subsequent average relative phase with respect to the reference clock signal based upon a second plurality of relative phases of a second plurality of transitions of the incoming bit stream and based upon the initial average relative phase. In such case, the transition phase averaging circuitry may: (1) determine an initial sampling phase with respect to the reference clock signal based upon the initial average relative phase with respect to the reference clock signal; and (2) determine a subsequent sampling phase with respect to the reference clock signal based upon the subsequent average relative phase with respect to the reference clock signal. The operations are performed both for a startup sequence of the incoming bit stream and during data carrying portions of the incoming bit stream.

In determining an average relative phase of the detected transitions with respect to the reference clock signal the transition phase averaging circuitry may be required to normalize a detected transition based upon its position relative to the reference clock. The reference clock signal may include a plurality of clock signal phases, each of which has a common frequency and each of which is offset in phase from each other of the plurality of clock signal phases. In some embodiments, the reference clock has a frequency that is a multiple of a maximum transition rate of the incoming bit stream.

The transition detection circuitry may include a plurality of flip-flops, each of which is operably coupled to receive the input bit stream as its data input and a respective phase of the reference clock signal as its clock input. This structure also includes a first plurality of logic gates, each of which operably couples to receive a respective pair of flip-flop outputs as its inputs and detects a positive to negative transition of the input bit stream. This structure also includes a second plurality of logic gates, each of which operably couples to receive a respective pair of flip-flop outputs as its inputs to detect a negative to positive transition of the input bit stream.

Other features and advantages of the present invention will become apparent from the following detailed description of the invention made with reference to the accompanying drawings.

DETAILED DESCRIPTION OF THE INVENTION

Figure 1:
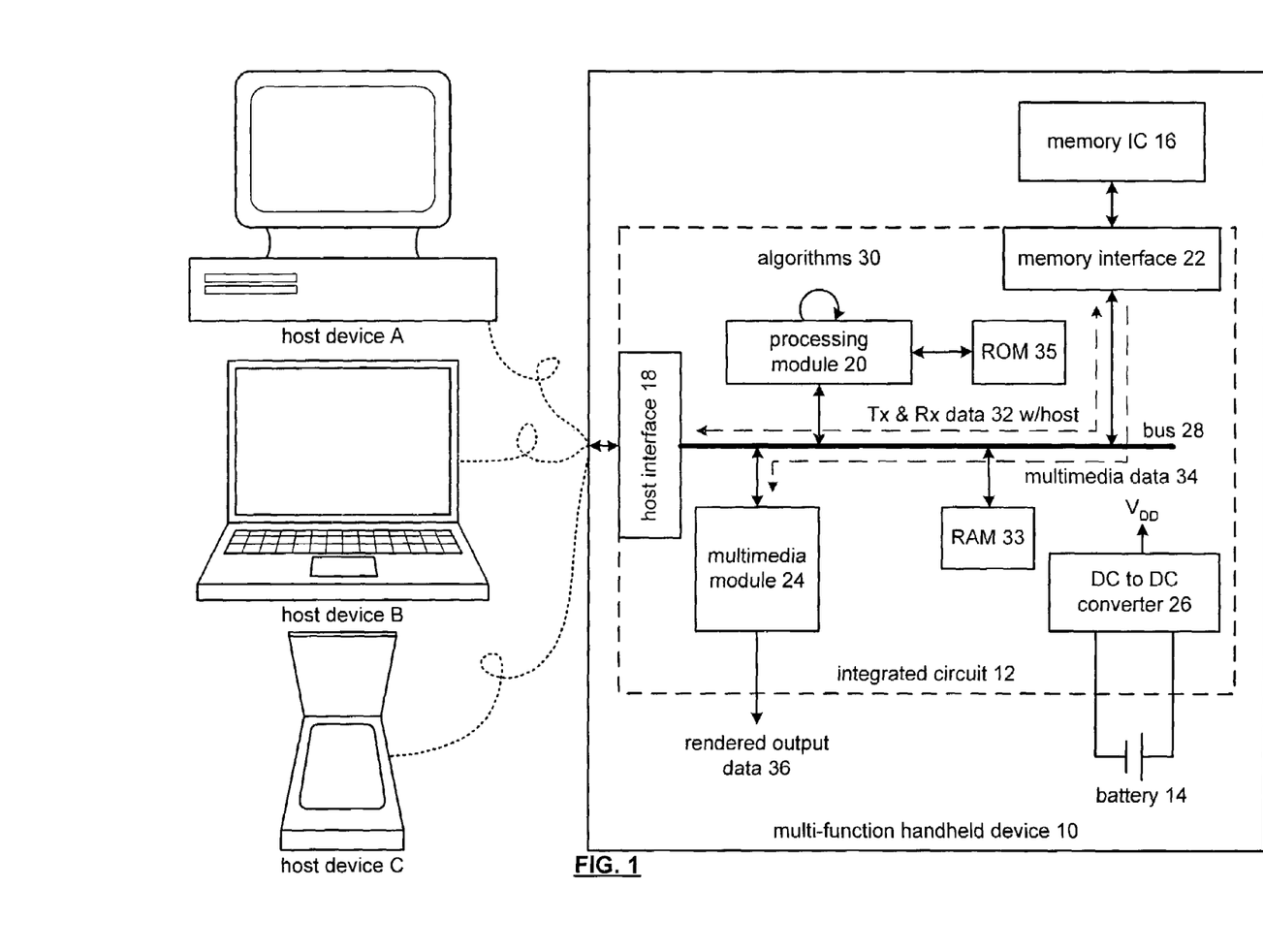
FIG. 1 is a schematic block diagram of a handheld device and corresponding integrated circuit in accordance with the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, where the corresponding operational instructions of the algorithm 30 are stored in memory 16 and/or in memory incorporated in the processing module 20. The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., TX data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., TX data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to various computer services (e.g., Internet access, email, etc.), digital audio files (e.g., MP3 files, WMA—Windows Media Architecture-, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital recording, MPEG file playback, JPEG file playback, text messaging display, cellular telephone functionality, and/or AM/FM radio reception.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art will appreciate, the handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
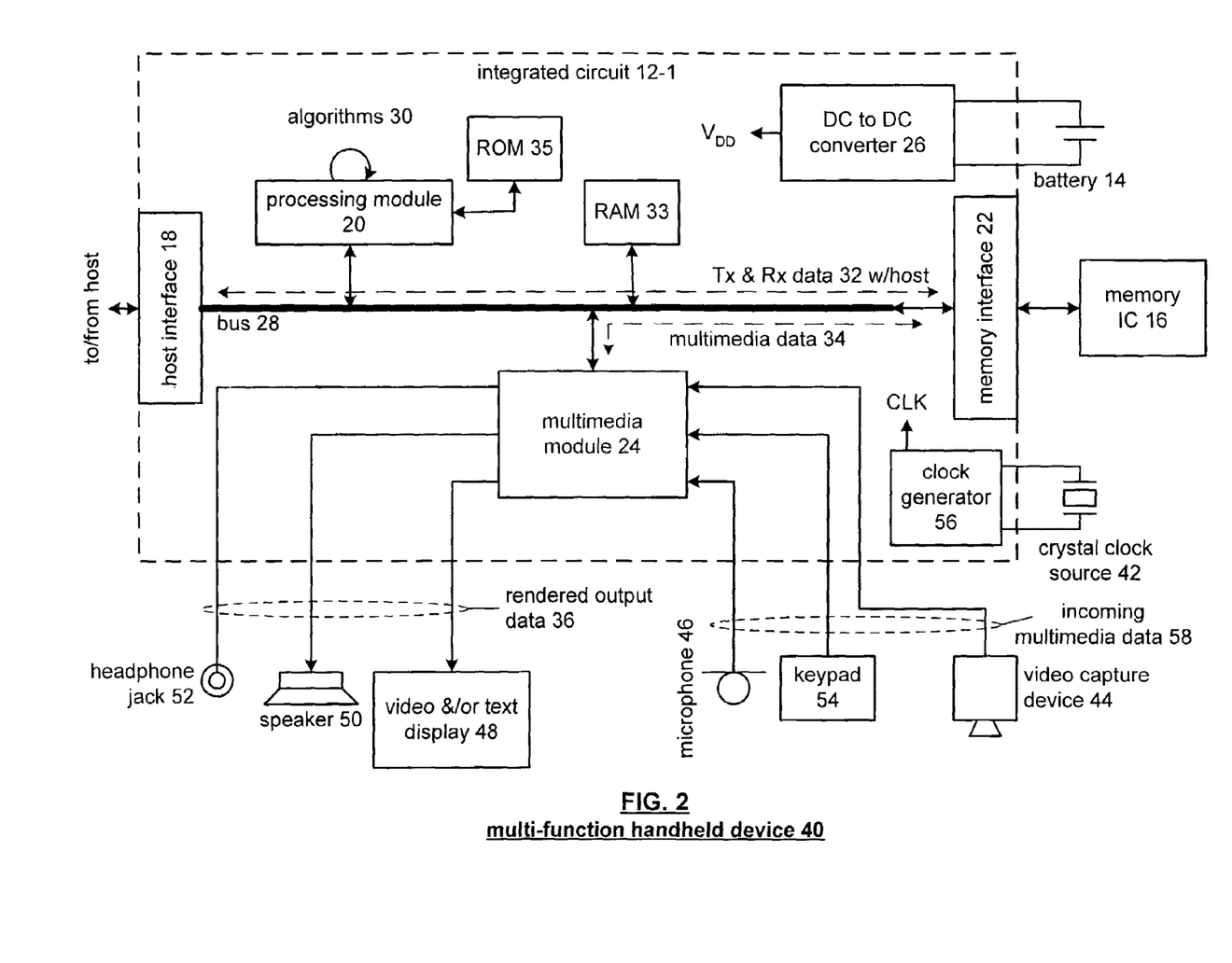
FIG. 2 is a schematic block diagram of another handheld device and corresponding integrated circuit in accordance with the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. As one of average skill in the art will appreciate, the clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24, and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the keypad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54. These operations will be described further in detail with reference to FIGS. 4-7.

Figure 3:
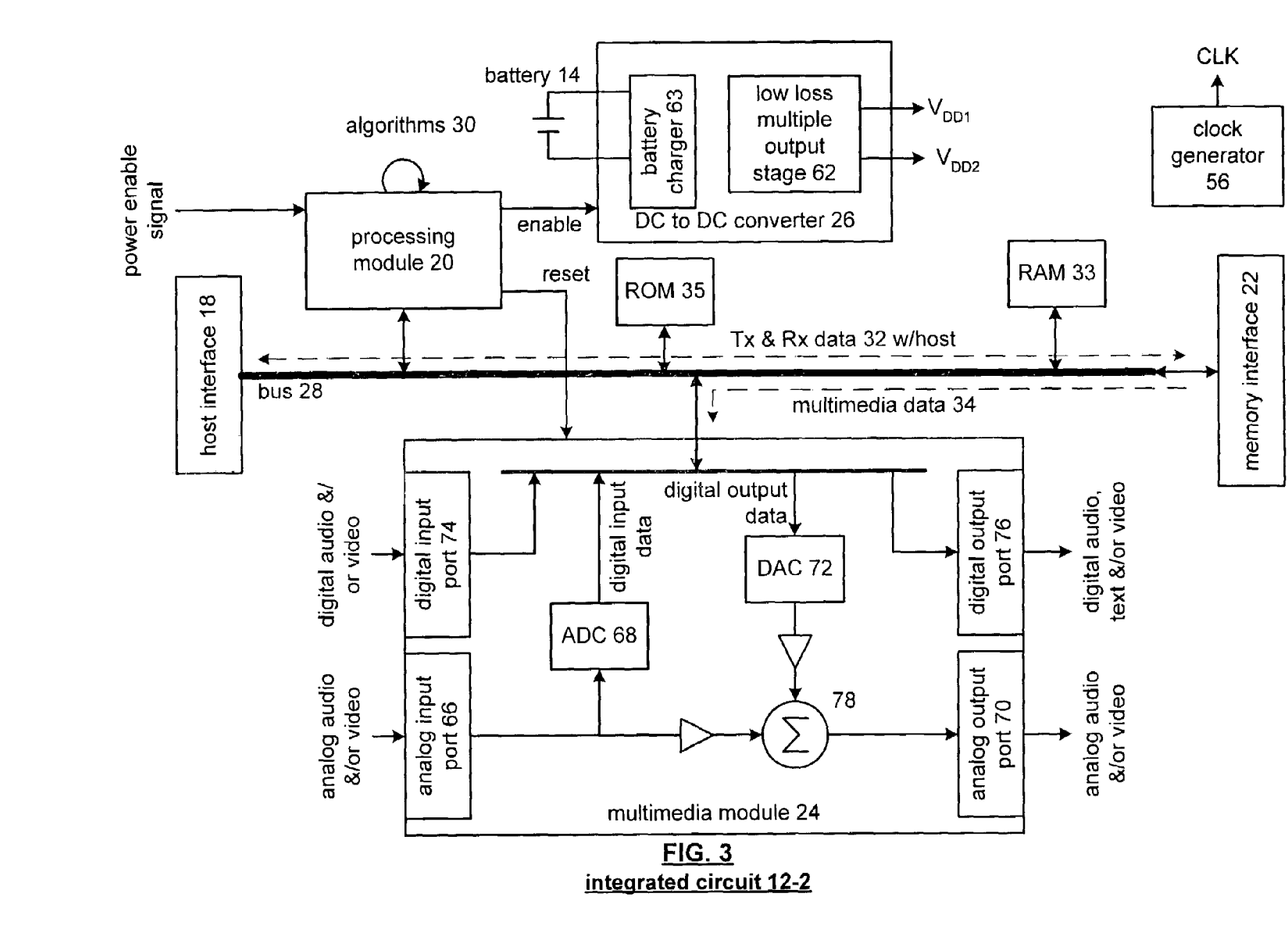
FIG. 3 is a schematic block diagram of another integrated circuit in accordance with the present invention.

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28, and the multimedia module 24. The DC-to-DC converter 26 includes a first output section 62, and a second output section 64 to produce a first and second output voltage ($V_{DD1}$ and $V_{DD2}$), respectively. Typically, $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules. The DC-to-DC converter 26 may further include a battery charger 63 and a low loss multiple output stage 62. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations are known in the art, thus no further discussion will be provided regarding the battery charger 63 except to further illustrate the concepts of the present invention.

The multimedia module 24 includes an analog input port 66, an analog to digital converter (ADC) 68, an analog output port 70, a digital to analog converter (DAC) 72, a digital input port 74, a digital output port 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, is stored in memory 16 as instructed by the processing module 20.

The digital input port 74 is operably coupled to receive digital audio and/or video input signals from, for example, a digital camera, a camcorder, etc. The digital audio and/or video input signals may be stored in memory 16 under the control of the processing module 20. As one of average skill in the art will appreciate, the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

As one of average skill in the art will appreciate, the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that are coupled to the headphone jack and/or to the speaker. As another example, for recording voice samples (i.e., as a digital dictaphone), the multimedia module 24 may include the analog input port 66 coupled to the microphone and the ADC.

Figure 4:
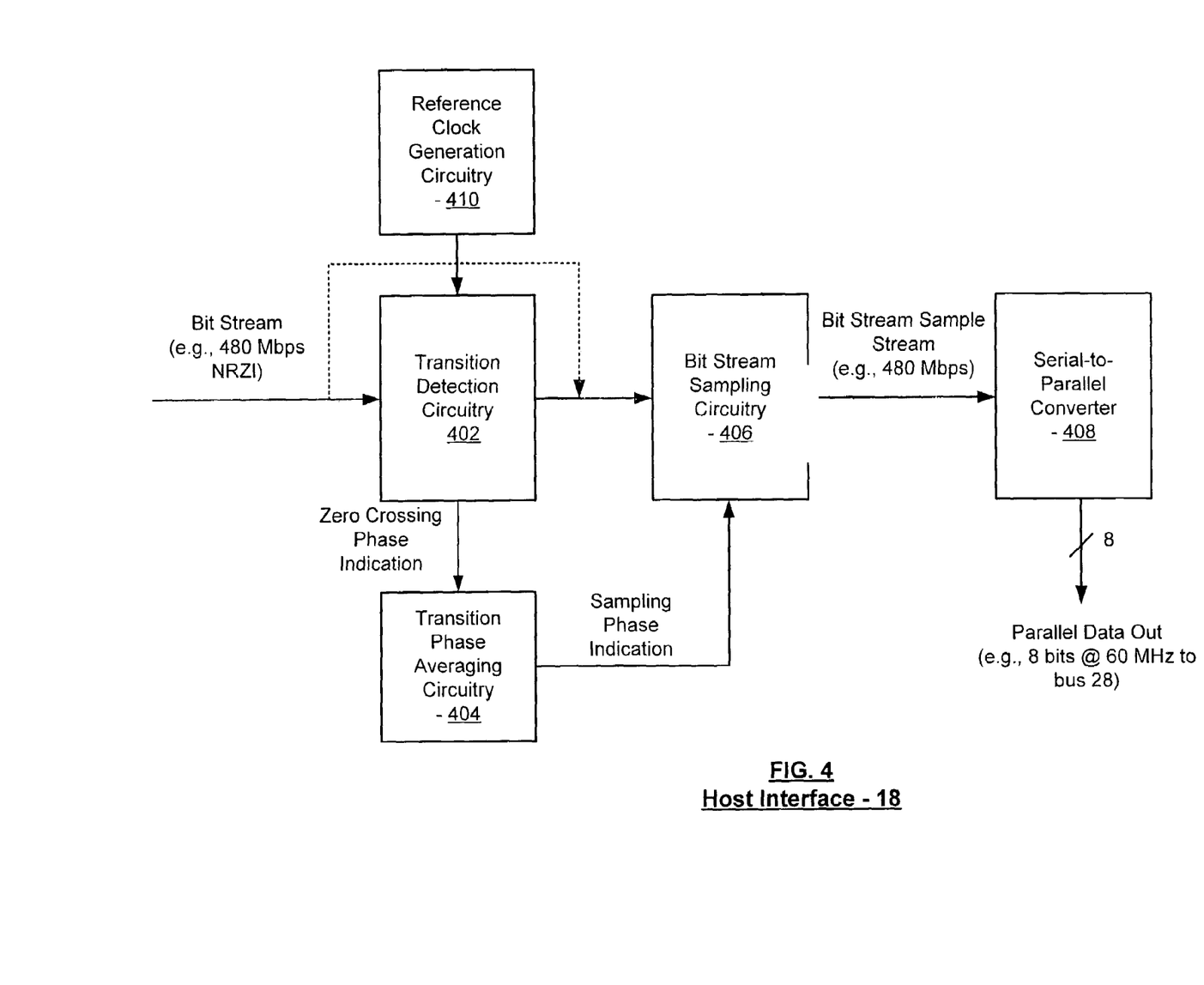
FIG. 4 is a schematic block diagram illustrating the host interface of the integrated circuit of FIGS. 1-3 that is constructed according to the present invention.

FIG. 4 is a schematic block diagram illustrating the host interface of the integrated circuit of FIGS. 1-3 that is constructed according to the present invention. The host interface 18 extracts bit values from an incoming bit stream and includes transition detection circuitry 402, transition phase averaging circuitry 404, and bit stream sampling circuitry 406. The transition detection circuitry 402 receives the incoming bit stream and a reference clock signal from reference clock generation circuitry 410.

The incoming bit stream, in the illustrated embodiment, complies with the Universal Serial Bus (USB) 2.0 interface standard. According to the USB 2.0 interface standard, the incoming bit stream is a differential signal that uses a Non-Return to Zero Inverted (NRZI) format in which binary zeros are represented by a transition and binary ones are represented by a non-transition. The rate supported by the USB 2.0 interface standard is 480 MBPS, which translates to a maximum transition rate of 480 MHz. As is known, a number of devices may share the USB, with each device acting as a repeater for transmitted bit streams. According to the Universal Serial Bus (USB) 2.0 interface standard, transmissions on the USB are initiated with a startup sequence having a plurality of transitions at the 480 MHz rate. During this startup sequence, an initiating device transmits thirty-one binary zeros in a row followed by a binary one. Thus, during the startup sequence, the incoming bit stream includes 31 transitions at a rate of 480 MHz followed by a non-transition. However, because the USB 2.0 interface standard allows devices (five USB hubs) servicing the USB to drop transitions, a receiving device may only receive eleven binary zeros (transitions) prior to receiving the binary one. While the USB 2.0 interface standard specifies a differential signal format, for simplicity in explanation, single ended signals are described herein.

According to the present invention, the transition detection circuitry 402 detects transitions of the incoming bit stream with respect to the reference clock signal and determines relative phases of the transitions with respect to the reference clock signal. The transition phase averaging circuitry 404 is operably coupled to the transition detection circuitry 402 and determines an average relative phase of the detected transitions with respect to the reference clock signal. The transition phase averaging circuitry 404 also determines, based upon the average relative phase of the detected transitions with respect to the reference clock signal, a sampling phase with respect to the reference clock signal. Bit stream sampling circuitry 406 operably couples to the transition phase averaging circuitry 402 and to the transition detection circuitry 402. The bit stream sampling circuitry 406 samples the incoming bit stream at the sampling phase with respect to the reference clock signal to extract the bit values. The apparatus may also include a serial to parallel converter 408 that receives a bit stream sample stream (bit values) from the bit stream sampling circuitry 406 and converts the bit stream sample stream to parallel data out, e.g., eight bits at 60 MHz.

Figure 5A:
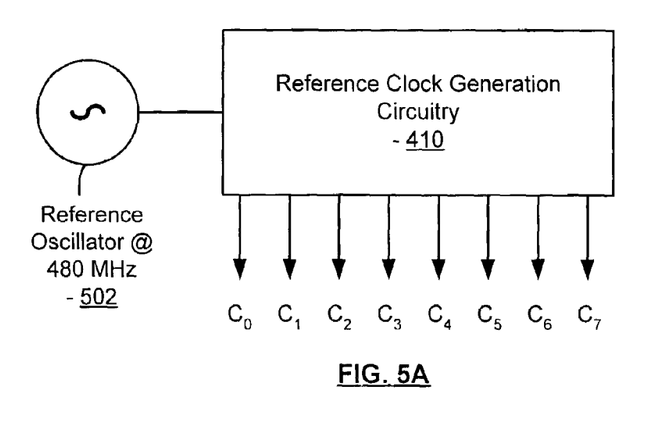
FIGS. 5A, 5B, and 5C are a block diagram, a signal transition diagram, and a phasor diagram illustrating the manner in which the reference clock generation circuitry of FIG. 4 operates.
Figure 5B:
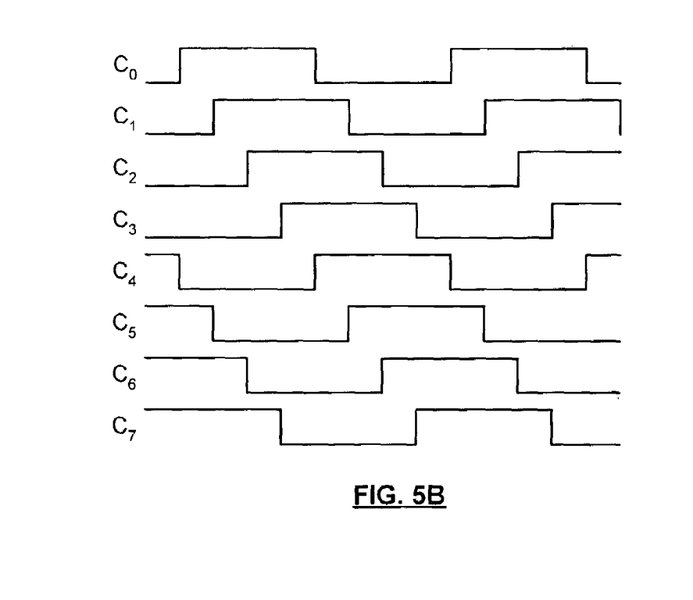
Figure 5C:
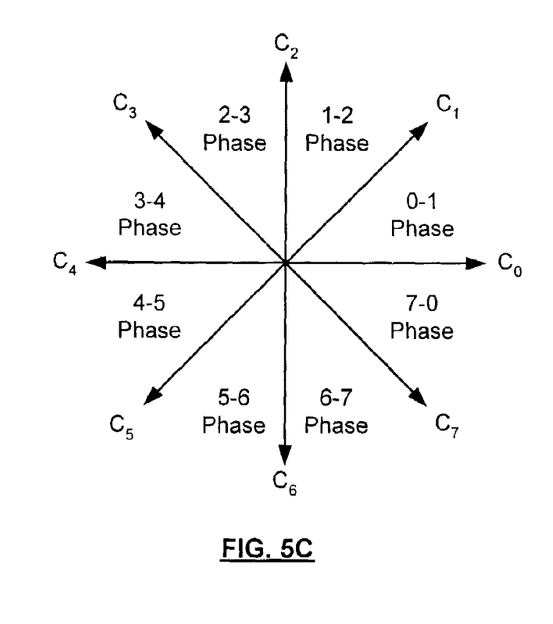

FIGS. 5A, 5B, and 5C are a block diagram, a signal transition diagram, and a phasor diagram illustrating the manner in which the reference clock generation circuitry 410 of FIG. 4 operates. According to a first embodiment of the present invention, the reference clock generation circuitry 410 generates an eight-phase clock having a plurality of clock signal phases $C_0, C_1, \ldots, C_7$. Each of the clock phases has a common frequency of 480 MHz that is based upon a reference oscillator 502. Each of the plurality of clock phases is offset in phase from each other of the plurality of clock signal phases. The phase relationship of the clock phases is shown particularly in FIG. 5B in the time domain and in FIG. 5C in the phase domain. As is shown particularly in FIG. 5C, the eight clock phases may be mapped to eight segments, each of which resides between adjacent clock phases. The frequency of each of these eight clock phases corresponds to a maximum transition rate of the incoming bit stream. However, the frequency of the reference clock will typically not correspond exactly to the maximum transition frequency of the incoming bit stream because the incoming bit stream was produced based upon a local clock of the transmitting device.

Figure 6:
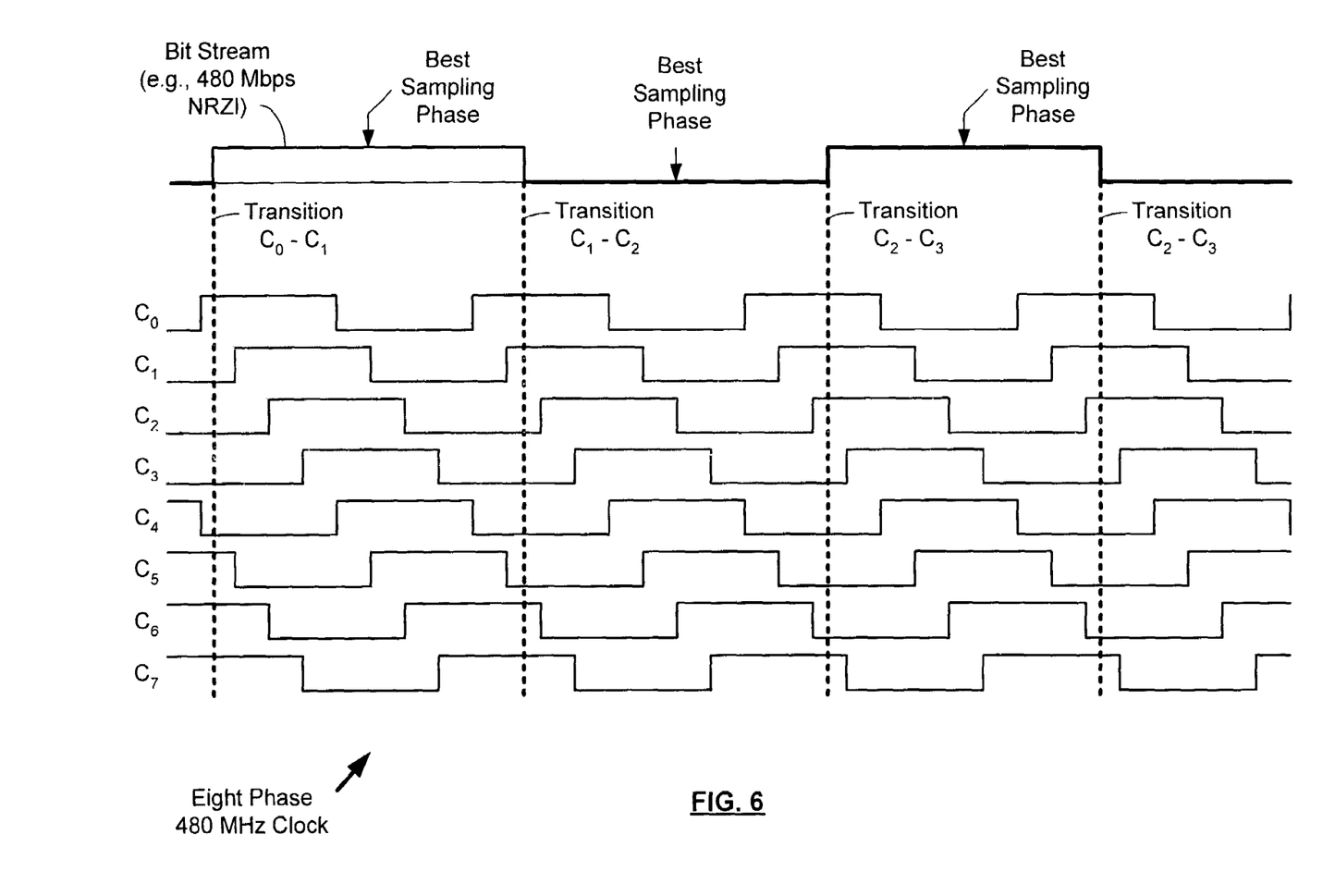
FIG. 6 is a signal transition diagram illustrating the manner in which the an incoming bit stream relates to the reference clock of FIG. 5B.

FIG. 6 is a signal transition diagram illustrating the manner in which the an incoming bit stream relates to the reference clock of FIG. 5B. A USB transmitting device has a local clock that it uses as a reference in creating the bit stream. The reference oscillator 502 produces a clock that is intended to match the frequency of the local clock of the transmitting device. A mismatch between these clocks results in clock drift. In order to accurately recover bits from the incoming bit stream, it is essential to sample the incoming bit stream as close as possible in the middle of the bit period, i.e., "best sampling phase."

As is shown in FIG. 6, the incoming bit stream transitions approximately at the 480 MHz rate during the startup sequence. As is also shown, a mismatch exists between the reference clock signal such that the transitions may occur during different phases of the eight-phase clock. In particular, the incoming bit stream transitions at phase $C_0$-$C_1$ at a first transition, at phase $C_1$-$C_2$ at a second transition, and at phase $C_2$-$C_3$ at third and fourth transitions. In order to fully understand the concepts conveyed in FIG. 6, the reader is referred to FIGS. 5B and 5C. Each clock phase has a frequency of oscillation of 480 MHz and is offset from each other clock phase by $2\pi/8$ radians (45 degrees). The incoming bit stream, which is not synchronized to the reference clock signal, transitions at varying phases of the reference clock signal. Thus, a transition may occur in any of the eight segments. Adjacent transitions may occur in differing segments, such as is shown in FIG. 6. It is desired to sample the incoming bit stream in a segment that is $\pi$ radians (opposite in phase) from the transition point, i.e., "best sampling phase." By sampling the bit stream at this point, a most reliable sample is captured. The structure and method of operation of the present invention is intended to detect the transitions, average the transitions, and based upon the average of the transitions determine the "best sampling phase."

Figure 7:
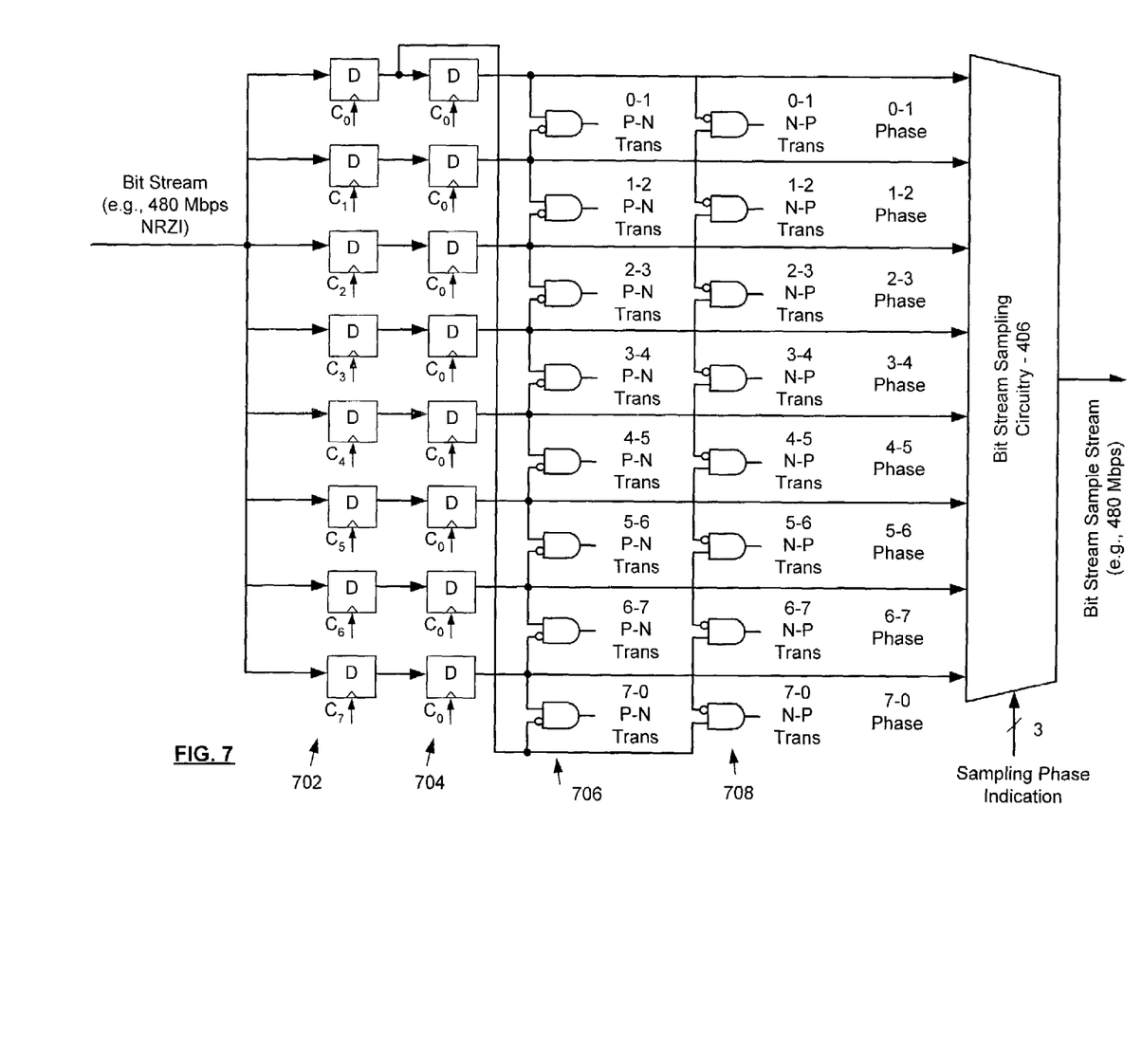
FIG. 7 is a schematic block diagram illustrating a first embodiment of the transition detection circuitry and the bit stream sampling circuitry of FIG. 4.

FIG. 7 is a schematic block diagram illustrating a first embodiment of the transition detection circuitry and the bit stream sampling circuitry of FIG. 4. The transition circuitry includes a plurality of flip-flops 702, each of which is operably coupled to receive the input bit stream as its data input and a respective phase of the reference clock signal as its clock input. A second plurality of flip-flops 704 receives the outputs of the first plurality of flip-flops 702 and aligns the outputs based upon one of the eight clock phases, e.g., $C_0$. A first plurality of logic gates 706, each of which is operably coupled to receive a respective pair of flip-flop outputs as its inputs, detects a positive to negative transition of the input bit stream. A second plurality of logic gates 708, each of which is operably coupled to receive a respective pair of flip-flop outputs as its inputs, detects a negative to positive transition of the input bit stream. The outputs of the first plurality of logic gates 706 and the second plurality of logic gates 708 are received by the transition phase averaging circuitry 404. The bit stream sampling circuitry 406 receives the outputs of the second plurality of flip-flops 704 and the sampling phase indication from the transition phase averaging circuitry 404.

Figure 8:
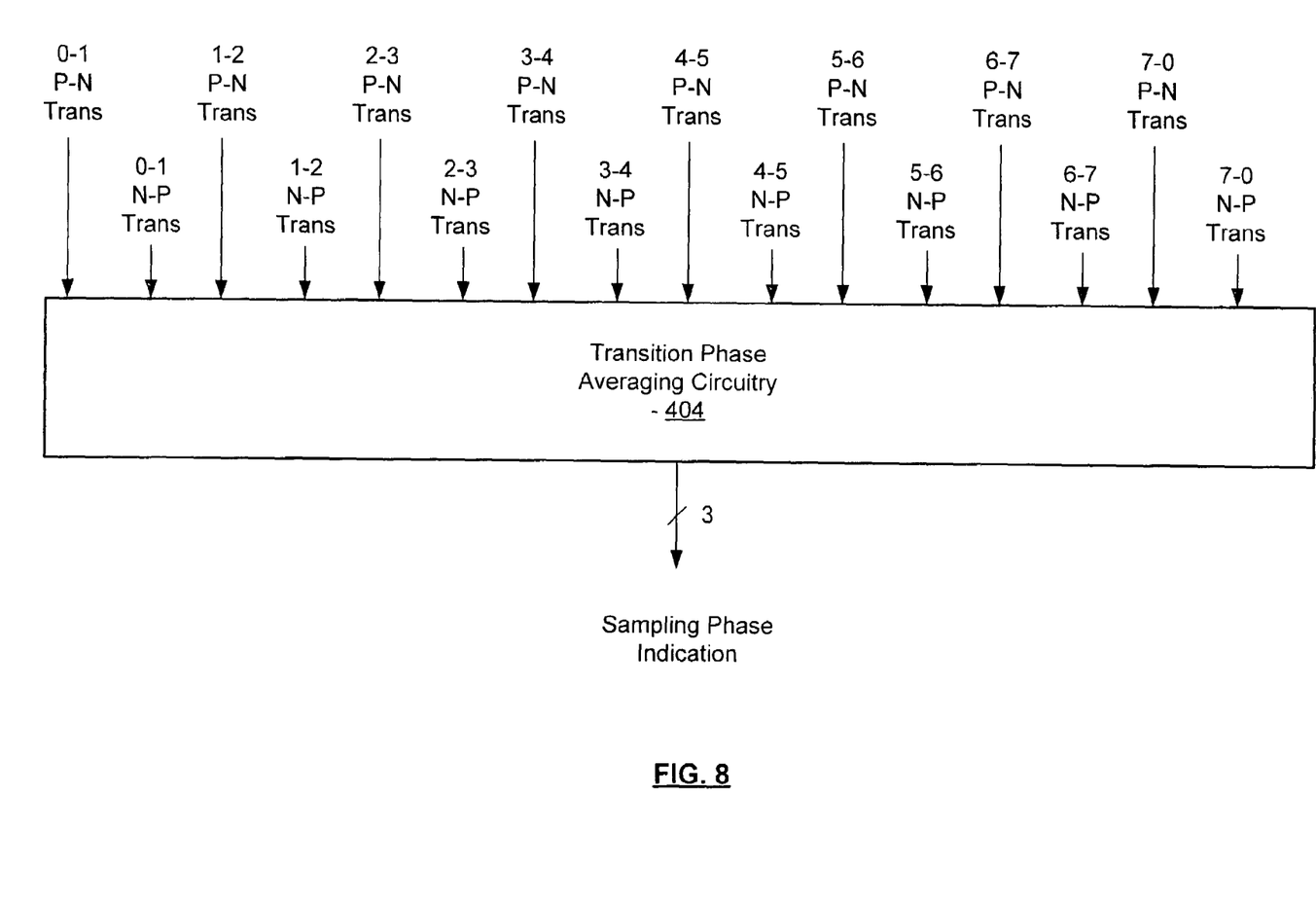
FIG. 8 is a schematic block diagram illustrating a first embodiment of the transition phase averaging circuitry of FIG. 4.

FIG. 8 is a schematic block diagram illustrating a first embodiment of the transition phase averaging circuitry of FIG. 4. As shown, the transition phase averaging circuitry 402 receives the outputs of the first plurality of logic gates 706 and the second plurality of logic gates 708. The transition phase averaging circuitry 402 may be implemented in hardware, software, firmware, or in a combination of these. The operations of the transition phase averaging circuitry 402 will be described further with reference to FIG. 9 and produces a three-bit sampling phase indication as its output.

Figure 9:
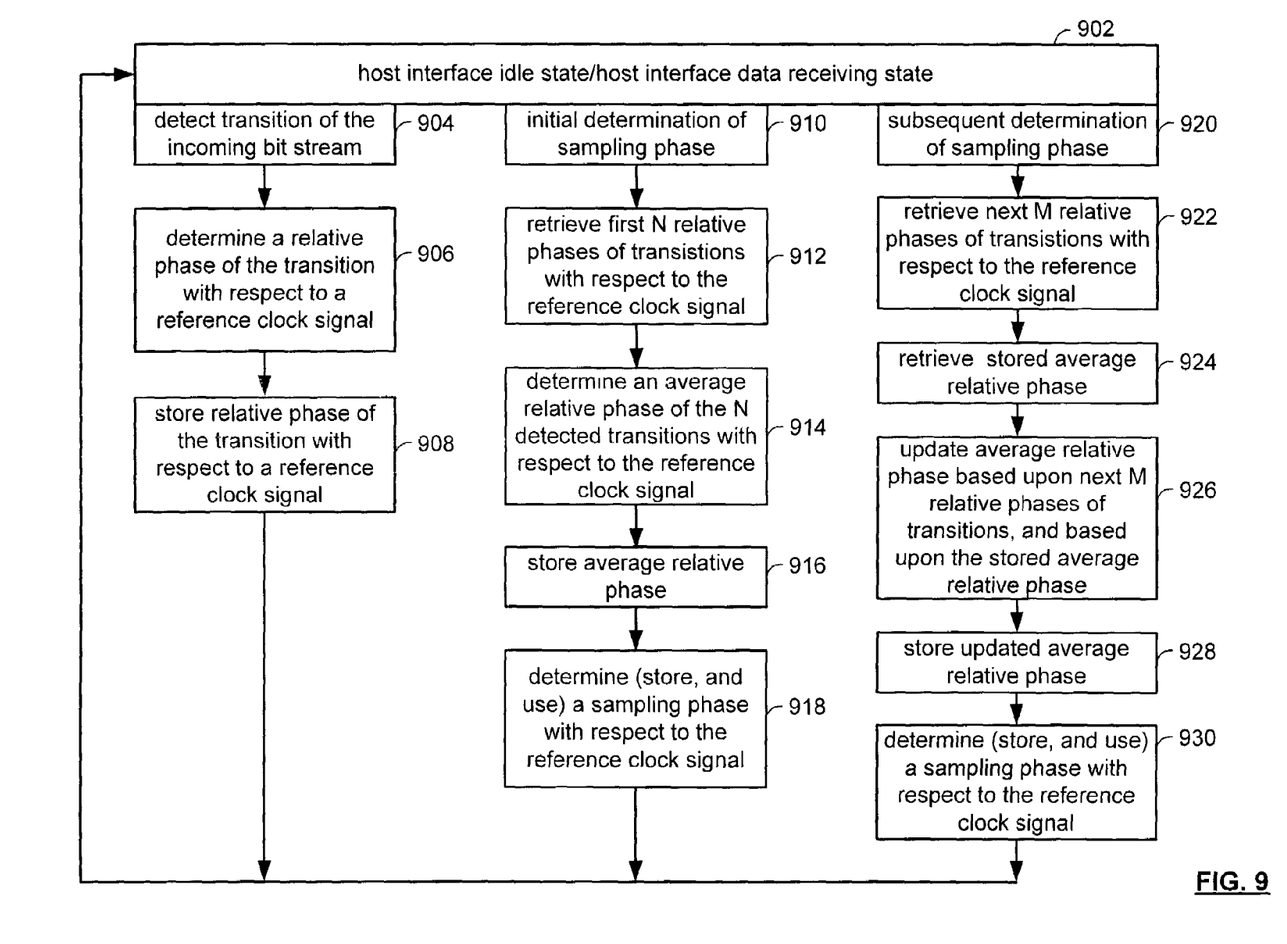
FIG. 9 is a flow chart illustrating operation according to the present invention.

FIG. 9 is a flow chart illustrating operation according to the present invention. In a host interface idle state or a host interface data receiving state the host interface 18 is either awaiting a the startup sequence in which it will determine the sampling phase or is sampling the incoming bit stream according to the sampling phase (step 902).

When the transition detection circuitry 402 detects a transition of the incoming bit stream (step 904), the transition detection circuitry 402 determines a relative phase of the transition with respect to the reference clock signal (step 906). The transition detection circuitry 402 passes the relative phase of the transition to the transition phase averaging circuitry 404 for storage (step 908). Operation then returns to step 902.

The sampling phase is determined either initially during the startup sequence (step 910) or subsequently either during the startup sequence or during data extraction operations when the incoming bit stream is carrying data. According to one particular embodiment, the sampling phase is updated upon every two detected transitions.

Upon the initial determination of the sampling phase (step 910) the transition phase averaging circuitry 404 retrieves the first N, e.g., 2, relative phases of transitions with respect to the reference clock signal (step 912). Then, based upon the retrieved N relative phases, the transition phase averaging circuitry 404 determines an average relative phase of the N detected transitions (step 914) and then stores this average (step 916). Further, based upon the average relative phase of the N detected transitions, the transition phase averaging circuitry 404 determines and stores a sampling phase with respect to the reference clock signal (step 918). The transition phase averaging circuitry also passes the sampling phase to the bit stream sampling circuitry 406, which the bit stream sampling circuitry 406 uses to sample the incoming bit stream and to extract data therefrom.

Upon a subsequent determination of the sampling phase (step 920) the transition phase averaging circuitry 404 retrieves the next M, e.g., 2, relative phases of transitions with respect to the reference clock signal (step 922). The transition phase averaging circuitry 406 then retrieves the stored average relative phase (step 924) that was stored at step 916 (and at step 928). Then, based upon the retrieved M relative phases and the stored average, the transition phase averaging circuitry 404 updates the average relative phase (step 926) and then stores the updated average relative phase (step 928). Further, based upon the updated average relative phase, the transition phase averaging circuitry 404 determines and stores a sampling phase with respect to the reference clock signal (step 930). The transition phase averaging circuitry also passes the sampling phase to the bit stream sampling circuitry 406, which the bit stream sampling circuitry 406 uses to sample the incoming bit stream and to extract data therefrom.

In one particular embodiment of the present invention, a four-bit register (AVERAGE) is allocated for the average relative phase value. This four-bit register AVERAGE is initialized at step 916 and updated at step 928 based upon the transition values. Another four-bit register POINTER represents the sampling phase and opposes in phase the value of the register AVERAGE. Because the registers are four bits in size, the relative positions of the transitions and of the sampling phase must be considered when updating these registers. In particular, the value of the transitions must be normalized when they vary by more than four phases of the eight-phase clock, e.g., a 2-3 phase and a 7-0 phase could be averaged either as $C_1$ or $C_5$. If the sampling phase was previously $C_5$, for example, the transitions should be normalized to average at $C_1$. Alternately, if the sampling phase was previously $C_0$, for example, the transitions should be normalized to average at $C_5$. By updating the value of AVERAGE upon each M detected transitions, the total of all transitions will effectively be averaged, causing the technique to enact a low pass filtering methodology.

Figure 10A:
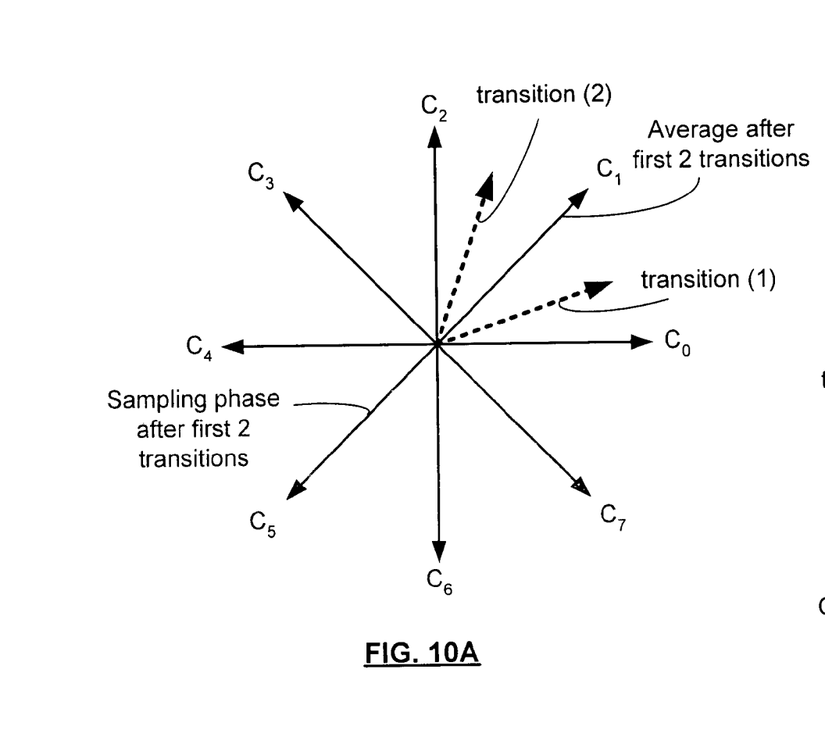
FIGS. 10A and 10B are phasor diagrams employed to further describe operation according to the present invention.
Figure 10B:
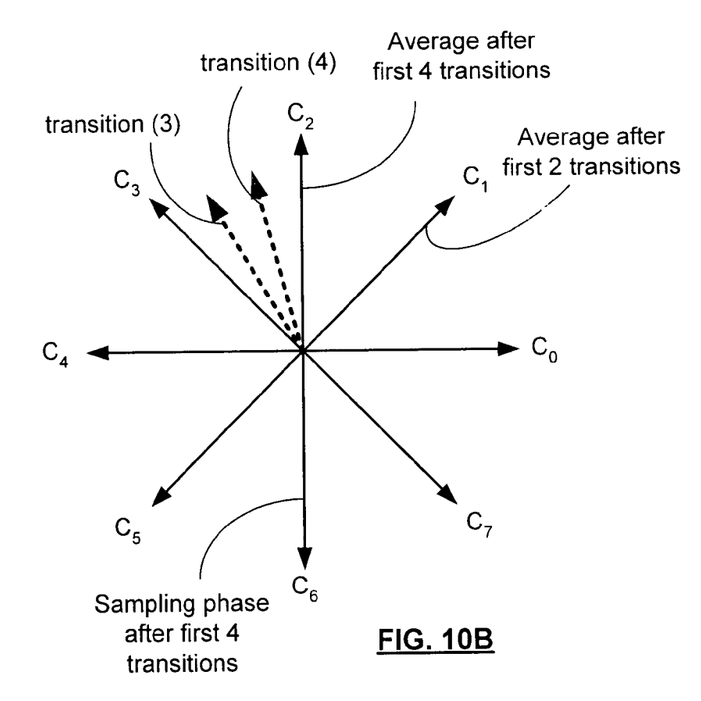

FIGS. 10A and 10B are phasor diagrams employed to further describe operation according to the present invention. As illustrated in FIG. 10A, a first transition occurs between clock phases $C_0$ and $C_1$ while a second transition occurs between clock phases $C_1$ and $C_2$. While the transition detection circuitry 402 does not know precisely where the transitions occur, it does know in which of the eight segments the transitions occur and reports such to the transition phase averaging circuitry 404. Thus, after the first two transitions, the transition phase averaging circuitry 404 averages the transitions to determine that the average relative phase coincides to $C_1$ and determines the sampling phase to correspond to $C_5$. The bit stream sampling circuitry 406 then samples the incoming bit stream at the clock phase $C_5$.

As illustrated in FIG. 10B, both third and fourth transitions occur between clock phases $C_2$ and $C_3$. The transition phase averaging circuitry 404 averages these transitions with the stored average relative phase to update the average relative phase. The updated average relative phase coincides to $C_2$ and the new sampling phase corresponds to $C_6$. The bit stream sampling circuitry 406 then samples the incoming bit stream at the clock phase $C_6$.

Figure 11:
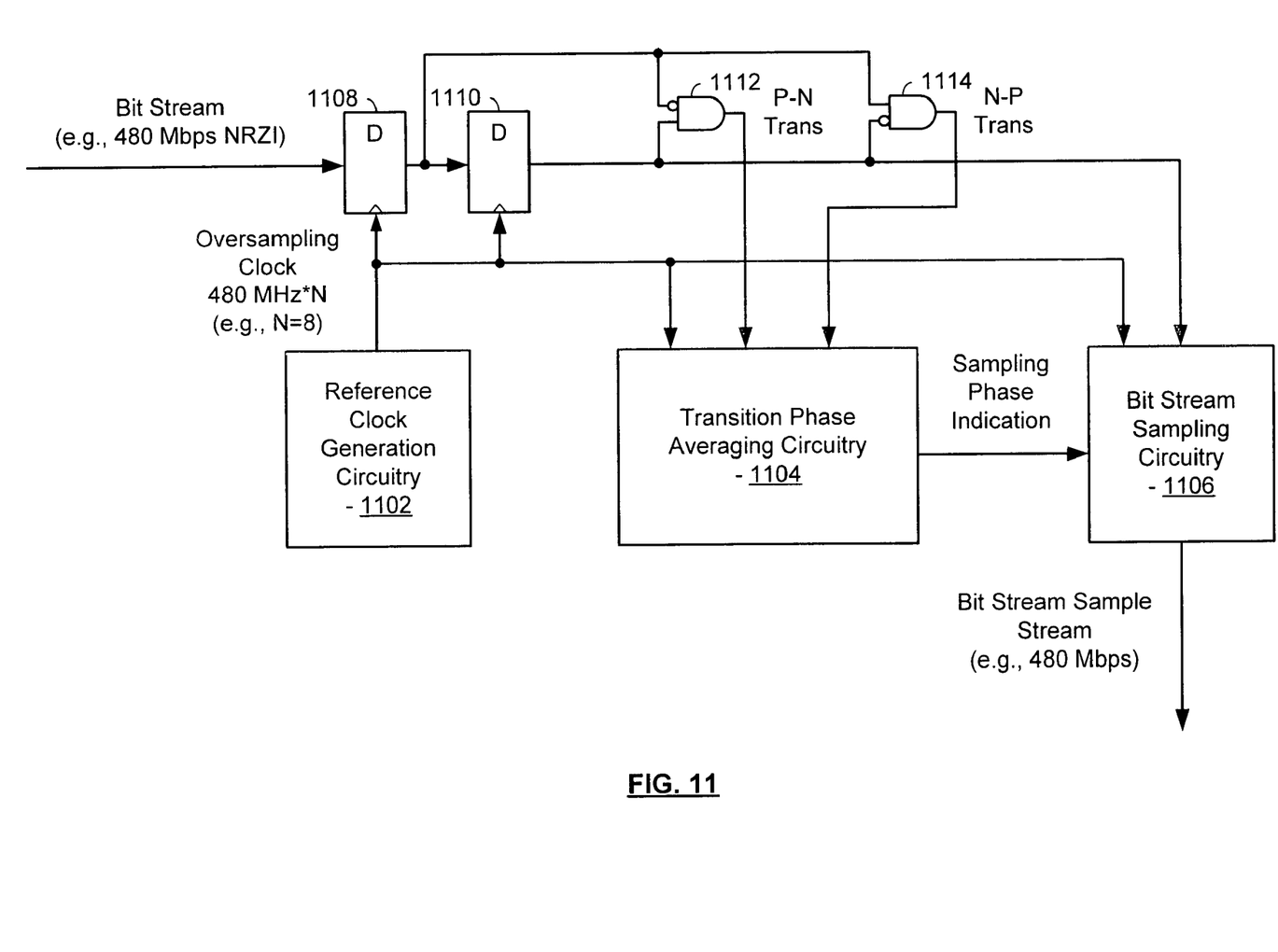
FIG. 11 is a block diagram illustrating an alternate embodiment of a host interface constructed according to the present invention.

FIG. 11 is a block diagram illustrating an alternate embodiment of a host interface constructed according to the present invention. In the alternate embodiment, the incoming bit stream is received by flip-flop 1108 that is clocked by an oversampling clock. Reference clock generation circuitry 1102 generates the oversampling clock at a frequency that is an N times multiple of the maximum transition rate of the incoming bit stream, e.g., N=8, oversampling clock frequency=480 MHz*8. A second flip-flop 1110 receives the output of the first flip-flop 1108. Logic gate 1112 and logic gate 1114 each receive as their inputs the outputs of the flip-flops 1108 and 1110. Logic gate 1112 detects a positive to negative transition of the bit stream while logic gate 1114 detects a negative to positive transition of the bit stream. The transition phase averaging circuitry 1104 receives as its inputs the reference clock and the outputs of logic gates 1112 and 1114. Based upon these inputs, the transition phase averaging circuitry 1104 determines a sampling phase indication that the bit stream sampling circuitry 1106 uses in conjunction with the reference clock to sample the incoming bit stream to produce a bit stream sample stream.

The preceding discussion has presented a host interface for a system-on-a-chip integrated circuit. As one of average skill in the art will appreciate, other embodiments may be derived from the teaching of the present invention, without deviating from the scope of the claims.

The invention claimed is:

1. A method for extracting bit values from an incoming bit stream, the method comprising:
    detecting transitions of the incoming bit stream;
    for each transition of the incoming bit stream detected, determining a relative phase of the transition with respect to a reference clock signal;
    determining an average relative phase of the detected transitions with respect to the reference clock signal by:
        determining an initial average relative chase with respect to the reference clock signal based upon a first plurality of relative phases of a first plurality of transitions of the incoming bit stream; and
        determining a subsequent average relative phase with respect to the reference clock signal based upon a second plurality of relative phases of a second plurality of transitions of the incoming bit stream and based upon the initial average relative phase;
    based upon the average relative phase of the transitions with respect to the reference clock signal, determining a sampling phase with respect to the reference clock signal; and
    sampling the incoming bit stream at the sampling phase with respect to the reference clock signal to extract the bit values.

2. The method of claim 1, wherein the incoming bit stream complies with the Universal Serial Bus 2.0 interface standard.

3. The method of claim 1, wherein determining a sampling phase with respect to the reference clock signal comprises:
    determining an initial sampling phase with respect to the reference clock signal based upon the initial average relative phase with respect to the reference clock signal; and
    determining a subsequent sampling phase with respect to the reference clock signal based upon the subsequent average relative phase with respect to the reference clock signal.

4. The method of claim 3, wherein determining the initial sampling phase with respect to the reference clock signal is performed during a startup sequence of the incoming bit stream.

5. The method of claim 4, wherein determining the subsequent sampling phase with respect to the reference clock signal is also performed during the startup sequence of the incoming bit stream.

6. The method of claim 4, wherein determining the subsequent sampling phase with respect to the reference clock signal is performed during a data carrying portion of the incoming bit stream.

7. The method of claim 1, wherein determining an average relative phase of the detected transitions with respect to the reference clock signal further comprises normalizing a detected transition based upon its position with respect to the reference clock signal.

8. The method of claim 1, wherein the reference clock signal comprises a plurality of clock signal phases, each of which has a common frequency and each of which is offset in phase from each other of the plurality of clock signal phases.

9. The method of claim 1, wherein the reference clock has a frequency that is a multiple of a maximum transition rate of the incoming bit stream.

10. An apparatus for extracting bit values from an incoming bit stream, the apparatus comprising:
   transition detection circuitry that receives the incoming bit stream and a reference clock signal, that detects transitions of the incoming bit stream with respect to the reference clock signal, and that determines relative phases of the transitions with respect to the reference clock signal;
   transition phase averaging circuitry operably coupled to the transition detection circuitry that determines an average relative phase of the detected transitions with respect to the reference clock signal by:
      determining an initial average relative phase with respect to the reference clock signal based upon a first plurality of relative chases of a first plurality of transitions of the incoming bit stream; and
      determining a subsequent average relative phase with respect to the reference clock signal based upon a second plurality of relative phases of a second plurality of transitions of the incoming bit stream and based upon the initial average relative phase;
   the transition phase averaging circuitry further determines, based upon the average relative phase of the detected transitions with respect to the reference clock signal, a sampling phase with respect to the reference clock signal; and
   bit stream sampling circuitry operably coupled to the transition phase averaging circuitry and to the transition detection circuitry that samples the incoming bit stream at the sampling phase with respect to the reference clock signal to extract the bit values.

11. The apparatus of claim 10, wherein the incoming bit stream complies with the Universal Serial Bus 2.0 interface standard.

12. The apparatus of claim 10, wherein in determining a sampling phase with respect to the reference clock signal, the transition phase avenging circuitry:
   determines an initial sampling phase with respect to the reference clock signal based upon the initial average relative phase with respect to the reference clock signal; and
   determines a subsequent sampling phase with respect to the reference clock signal based upon the subsequent average relative phase with respect to the reference clock signal.

13. The apparatus of claim 12, wherein the transition phase averaging circuitry determines the initial sampling phase with respect to the reference clock signal during a startup sequence of the incoming bit stream.

14. The apparatus of claim 13, wherein the transition phase averaging circuitry also determines the subsequent sampling phase with respect to the reference clock signal during the startup sequence of the incoming bit stream.

15. The apparatus of claim 13, wherein the transition phase averaging circuitry determines the subsequent sampling phase with respect to the reference clock signal during a data-carrying portion of the incoming bit stream.

16. The apparatus of claim 10, wherein in determining an average relative phase of the detected transitions with respect to the reference clock signal the transition phase averaging circuitry further normalizes a detected transition based upon its position with respect to the reference clock signal.

17. The apparatus of claim 10, wherein the reference clock signal comprises a plurality of clock signal phases, each of which has a common frequency and each of which is offset in phase from each other of the plurality of clock signal phases.

18. The apparatus of claim 10, wherein the reference clock has a frequency that is a multiple of a maximum transition rate of the incoming bit stream.

19. The apparatus of claim 10, wherein the transition detection circuitry comprises:
   a plurality of flip-flops, each of which is operably coupled to receive the input bit stream as its data input and a respective phase of the reference clock signal as its clock input;
   a first plurality of logic gates, each of which is operably coupled to receive a respective pair of flip-flop outputs as its inputs to detect a positive to negative transition of the input bit stream; and
   a second plurality of logic gates, each of which is operably coupled to receive a respective pair of flip-flop outputs as its inputs to detect a negative to positive transition of the input bit stream.

20. An apparatus for extracting bit values from an incoming bit stream comprising:
   means for detecting transitions of the incoming bit stream;
   means for, for each transition of the incoming bit stream detected, determining a relative phase of the transition with respect to a reference clock signal;
   means for determining an average relative phase of the detected transitions with respect to the reference clock signal by:
      determining an initial average relative phase with respect to the reference clock signal based upon a first plurality of relative phases of a first plurality of transitions of the incoming bit stream; and
      determining a subsequent average relative chase with respect to the reference clock signal based upon a second plurality of relative phases of a second plurality of transitions of the incoming bit stream and based upon the initial average relative phase;
   means for, based upon the average relative phase of the transitions with respect to the reference clock signal, determining a sampling phase with respect to the reference clock signal; and
   means for sampling the incoming bit stream at the sampling phase with respect to the reference clock signal to extract the bit values.

* * * * *